United States Patent
Zhang et al.

(10) Patent No.: US 7,044,691 B2
(45) Date of Patent: May 16, 2006

(54) FORMING METHOD FOR MILLING THREADS OF VARIABLE TOOTH WORMS

(75) Inventors: Yaxiong Zhang, Tianjin (CN); Lin Qi, Tianjin (CN)

(73) Assignee: Tsubaki Emerson Gear (Tianjin) Co., Ltd., Tianjin (CN)

( * ) Notice: Subject to any disclaimer, the term of this patent is extended or adjusted under 35 U.S.C. 154(b) by 539 days.

(21) Appl. No.: 10/440,969

(22) Filed: May 19, 2003

(65) Prior Publication Data

US 2004/0033114 A1 Feb. 19, 2004

Related U.S. Application Data

(63) Continuation-in-part of application No. 09/978,340, filed on Oct. 17, 2001, now abandoned.

(30) Foreign Application Priority Data

Dec. 1, 2000 (CN) ................................ 00 1 33681

(51) Int. Cl.
*B23F 11/00* (2006.01)
*B23F 13/00* (2006.01)

(52) U.S. Cl. ............................. 409/48; 409/12; 409/20

(58) Field of Classification Search .................. 409/48, 409/1, 12, 11, 17, 18, 20, 24, 38, 39, 41, 50–51; 451/47, 147, 161, 219, 275
See application file for complete search history.

(56) References Cited

U.S. PATENT DOCUMENTS 1,853,643 A * 4/1932 Simmons ...................... 409/39

(Continued)

FOREIGN PATENT DOCUMENTS

CN ZL96244108.2 8/1998

(Continued)

OTHER PUBLICATIONS

Derwent Abstract and Figure, SU 1315176-A, Published Jun. 1987.*
Derwent Abstract, SU 806301-B, Published Feb. 1981.*

(Continued)

*Primary Examiner*—Erica Cadugan
(74) *Attorney, Agent, or Firm*—Milde & Hoffberg, LLP

(57) ABSTRACT

A forming method for milling teeth of variable tooth worms (VTW) with the following features: on a multi-axis simultaneously-working CNC machine-tool a moving coordinate system $\{\sigma_1(\phi_1)[O_1; \vec{i}_1(\phi_1), \vec{j}_1(\phi_1), \vec{k}_1(\phi_1)]\}$ is correlated to the worm blank of the VTW worms, whereon the worm blank of the VTW worms rotates around $\vec{k}_1(\phi_1)$-axis at angular speed $|\vec{\omega}_1|$; another moving coordinate system $\{\sigma_2(\phi_2)[O_2; \vec{i}_2(\phi_2), \vec{j}_2(\phi_2), \vec{k}_2(\phi_2)]\}$ is correlated to the milling cutter, whereon the milling-cutter rotates around $\vec{k}_2(\phi_2)$-axis at angular speed $|\vec{\omega}_2|$, $|\vec{\omega}_1|/|\vec{\omega}_2|=i_{12}$ and $i_{12}$ is a constant; the feed motion of the milling cutter comprises the radial shift along $\vec{i}_2(o_2)$-axis and the peripheral shift around $\vec{k}_2(\phi_2)$-axis; the equations of the cutting edge of the milling cutter are given as below $x = u$ $y_2 = r_b - v \sin \beta$ $z_2 = v \cos \beta$.

12 Claims, 7 Drawing Sheets

U.S. PATENT DOCUMENTS

| | | | | |
|---|---|---|---|---|
| 4,184,796 A | * | 1/1980 | Sakai et al. | 409/12 |
| 5,456,558 A | * | 10/1995 | Horiuchi | 409/26 |
| 5,647,790 A | * | 7/1997 | Horiutchi et al. | 451/47 |
| 6,176,148 B1 | | 1/2001 | Zhang et al. | |

FOREIGN PATENT DOCUMENTS

| | | | | |
|---|---|---|---|---|
| FR | | 2603823 A1 | * | 3/1988 |
| JP | | 3-256615 A | * | 11/1991 |
| JP | | 2001-105232 A | * | 4/2001 |
| JP | | 2001-252823 A | * | 9/2001 |

OTHER PUBLICATIONS

Derwent Abstract and Figure, RU 2146579-C1, Published Mar. 2000.*

Derwent Abstract and Figure, CN- 1078931-A, Published Dec. 19993.*

* cited by examiner

FORMING METHOD FOR MILLING THREADS OF VARIABLE TOOTH WORMS

CROSS REFERENCE TO RELATED APPLICATION

This application is a continuation-in-part application of application Ser. No. 09/978,340 now abandoned, filed Oct. 17, 2001, entitled "METHOD OF FORMING MILLED TOOTH OF VARIABLE TOOTH WORM".

FIELD OF THE INVENTION

This invention relates to a forming method for milling the threads of cylindrical variable tooth worms.

BACKGROUND OF THE INVENTION

The worm transmissions may be classified into two sorts: the first sort is a cylindrical worm transmission; the second one is a toroidal worm transmission. While the cylindrical worms can further be classified into an involute helicoid worm (ZI for short, the same hereinafter), an Archimedes worm (ZA), a milled helicoid worm (ZK), and a variable tooth worm (VTW) disclosed in China patent No. ZL96244108.2 and U.S. Pat. No. 6,176,148B1 with accordance to the different profile thereof. The worms of ZI-, ZA- and ZK-type can all be formed by lathing with different-profile cutters. However, the relationship of the relative movement between the workpiece and the cutter is the same. Alternatively, the different types of worms such as ZI, ZA and ZK can be machined on the same machine tool with the worm blank turning and the cutter feeding along the longitudinal and radial directions relatively to the worm blank, the one thing must be done only is to change the corresponding cutter. Although the variable tooth worm (VTW) is classified into the cylindrical worms, they cannot be machined on the same facilities with the existing motion relationship even if the cutter were changed seeing that the tooth thickness of the variable tooth worms is changeable along either longitudinal or tooth height direction. The minimum tooth thickness of the worms is at the gorge part of the thread, while it gradually thickens toward both ends, as shown in the FIGS. 1 and 2.

The worms patented as disclosed in U.S. Pat. No. 1,853,643 with the title of "METHOD OF AND APPARATUS FOR GENERATING THE CONVOLUTE TEETH OR THREADS OF WORMS AND THE LIKE" (hereinafter referred to as Simmons patent) are machined by using a gear-shape cutter. The profile of the cutting edges of the gear shaped cutter for machining the thread of worms in Simmons patent is an involute in the end face. Let the radius of the basic cylindroid of the gear shaped cutter be $r_b$, the intersected line of tangential plane $\Sigma$ with the side surface of the cutter tooth is a straight line as shown in the FIG. 3. Therefore, Simmons method for forming the involute worms can not be used for forming the thread of variable tooth worms with a circular toroid, or an elliptic toroid, or a parabolic toroid.

SUMMARY OF THE INVENTION

The object of the present invention is to supplement the deficiency of the existing technology and to provide a forming method for milling the thread of variable tooth worms with high productivity and high machining accuracy.

In order to realize the object, the following technical solution will be adopted. A moving coordinate system $\{o_1(\phi_1)[O_1; \vec{i}_1(\phi_1), \vec{j}_1(\phi_1), \vec{k}_1(\phi_1)]\}$ is correlated to the worm blank of variable tooth worms and the worm blank rotates about $\vec{k}_1(\phi_1)$-axis at angular speed $\vec{\omega}_1$; A moving coordinate system $\{o_2(\phi_2)[O_2; \vec{i}_2(\phi_2), \vec{j}_2(\phi_2), \vec{k}_2(\phi_2)]\}$ is correlated to the milling cutter and the cutter rotates about $\vec{k}_2(\phi_2)$-axis at angular speed $\vec{\omega}_2$, whereof $|\vec{\omega}_1|/|\vec{\omega}_2|=i_{12}$, $i_{12}$ is a constant. The feeding movement of the milling cutter is composed by two components: one component is the radial shift along the $\vec{i}_2(o_2)$-axis; another the peripheral shift around $\vec{k}_2(\phi_2)$-axis. The equations of the cutting edge of the milling cutter are given as below.

$$x=u$$

$$y_2=r_b-v\sin\beta$$

$$z_2=v\cos\beta$$

Where, u,v are the parameters of the generatrix plane of variable tooth worm; $\beta$ is the inclination angle of the generatrix plane; $r_b$ is the radius of the main basic circle of the cutter body; $x_2$, $y_2$, $z_2$ are the coordinate values of the generatrix plane.

The advantages and the effect of this invention show that the machining method of this invention has higher productivity, more powerful cutting force, less machining hours and reaches higher machining accuracy as compared with other machining method for any cylindrical worm by means of a spatial cutter that has multiple blades thereon, therefore there are multiple edges simultaneously to take part in cutting the VTW worm blank.

DETAILED DESCRIPTION OF THE PREFERRED EMBODIMENTS

Figure 1:
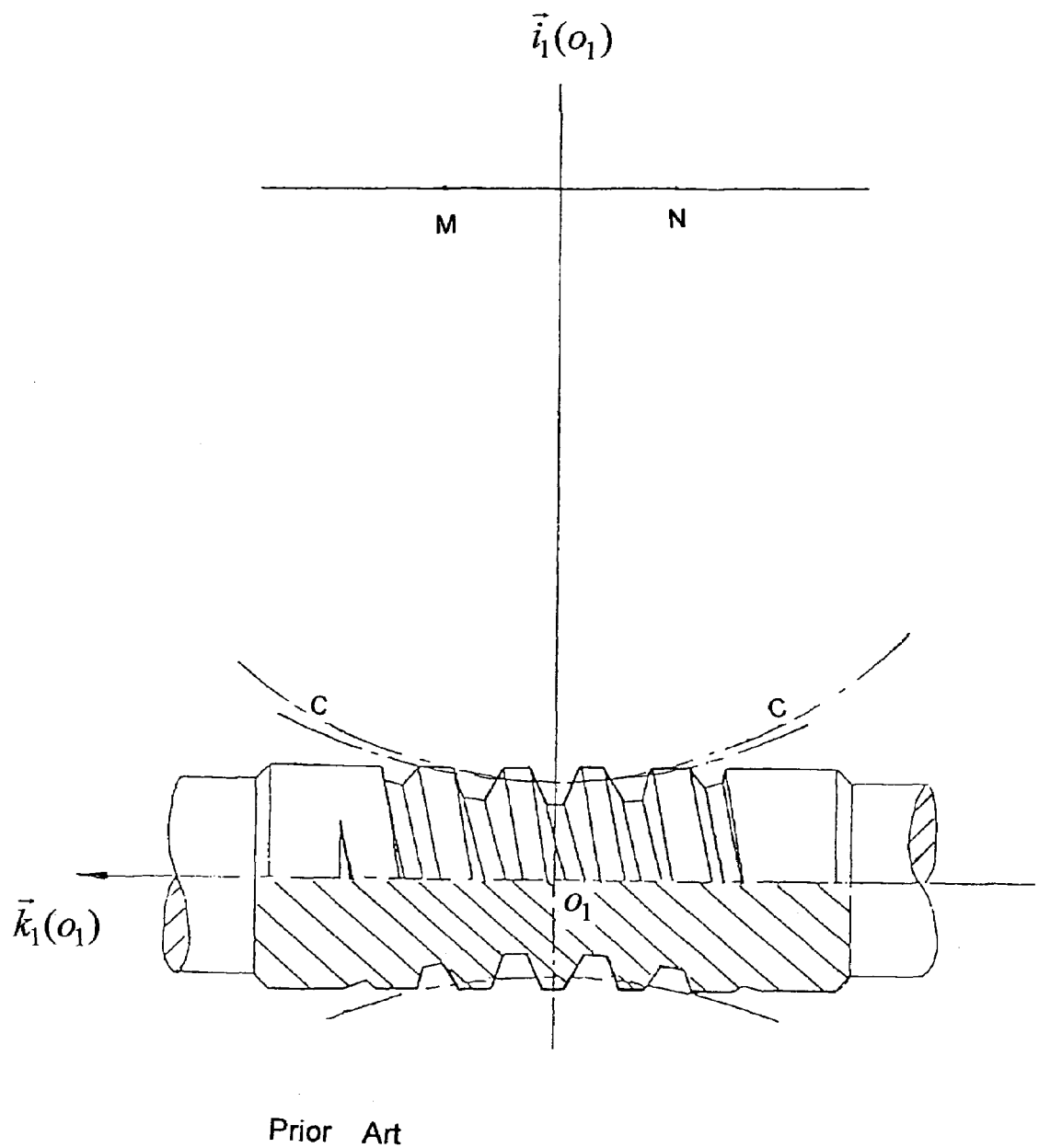
FIGS. 1 and 2 are the schematic views showing the VTW worm and the coordinate system of the prior art of China patent No. ZL96244108.2 (U.S. Pat. No. 6,176,148B1).
Figure 2:
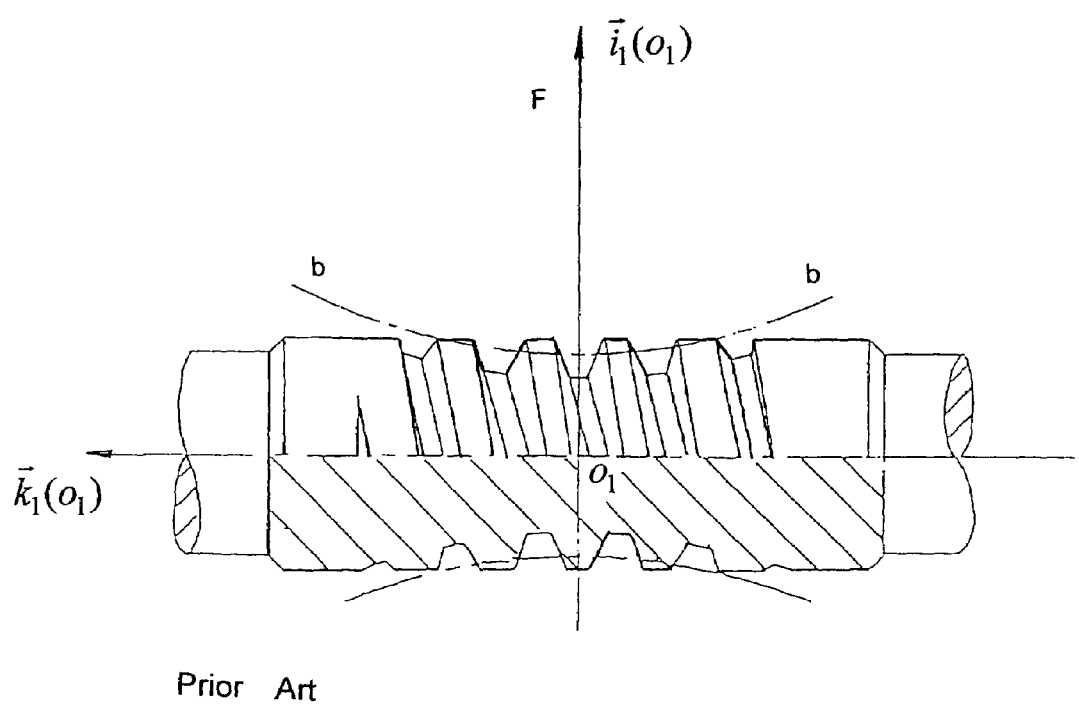
Figure 3:
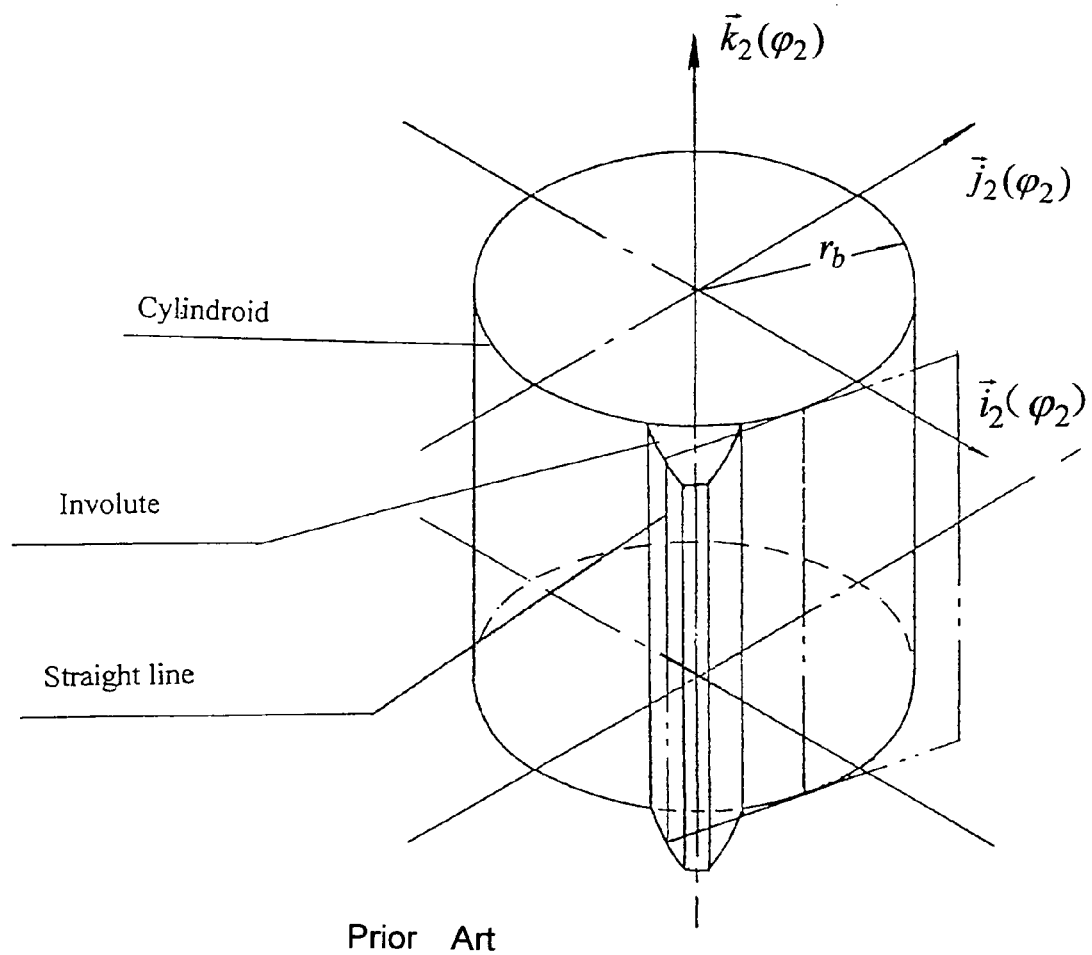
FIG. 3 is a schematic view showing the profile of the cutting edges of the gear shaped cutter of U.S. Pat. No. 1,853,643.
Figure 4:
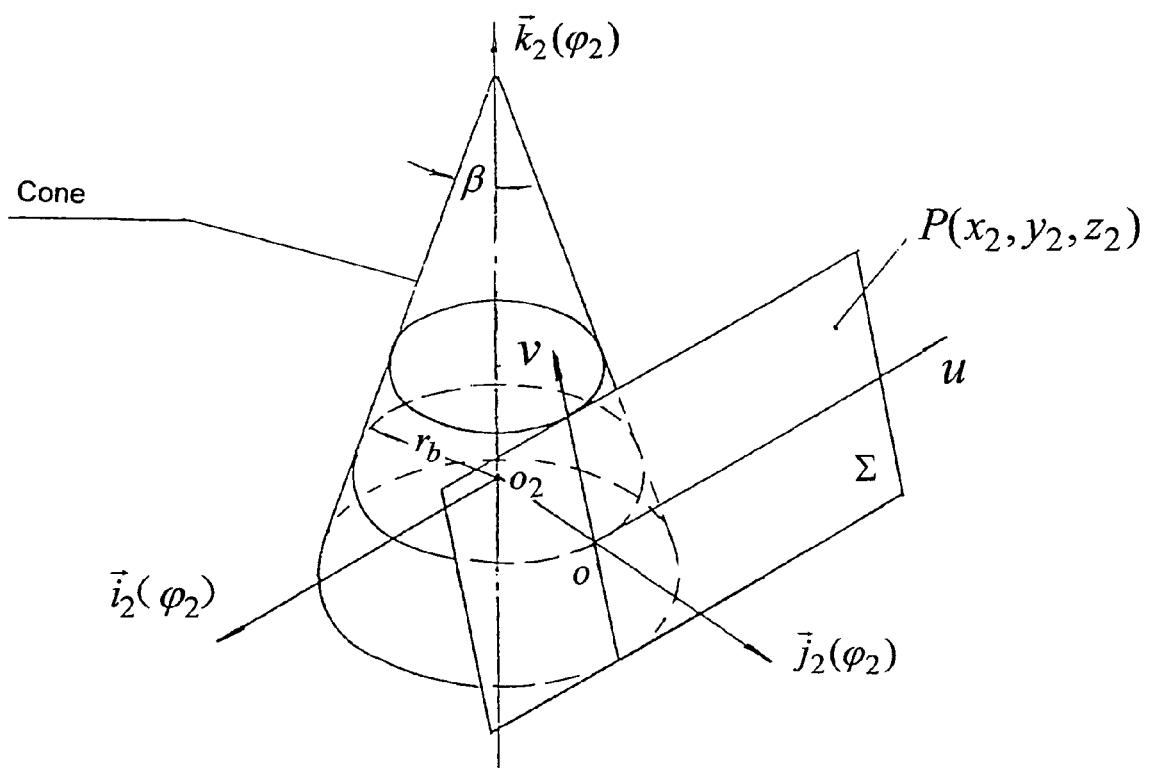
FIG. 4 is a schematic view showing the relationship between an imaginary cone and a generatrix plane thereof and a coordinate system $\{o_2(\phi_2)[O_2; \vec{i}_2(\phi_2), \vec{j}_2(\phi_2), \vec{k}_2(\phi_2)]\}$ according the principle of the invention.
Figure 6:
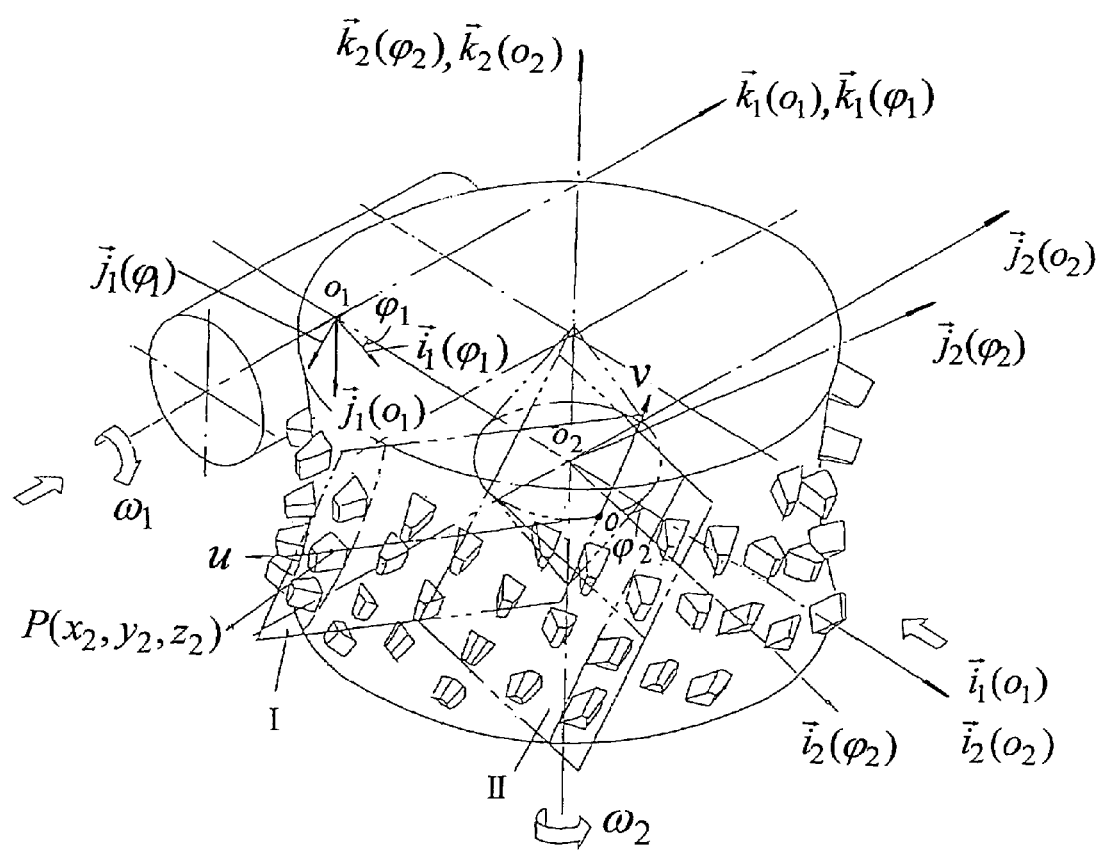
FIG. 6 is a schematic view further showing the relationship between disc-shaped cutter and a coordinate system $\{o_2(\phi_2)[O_2; \vec{i}_2(\phi_2), \vec{j}_2(\phi_2), \vec{k}_2(\phi_2)]\}$ according the principle of the invention.
Figure 7:
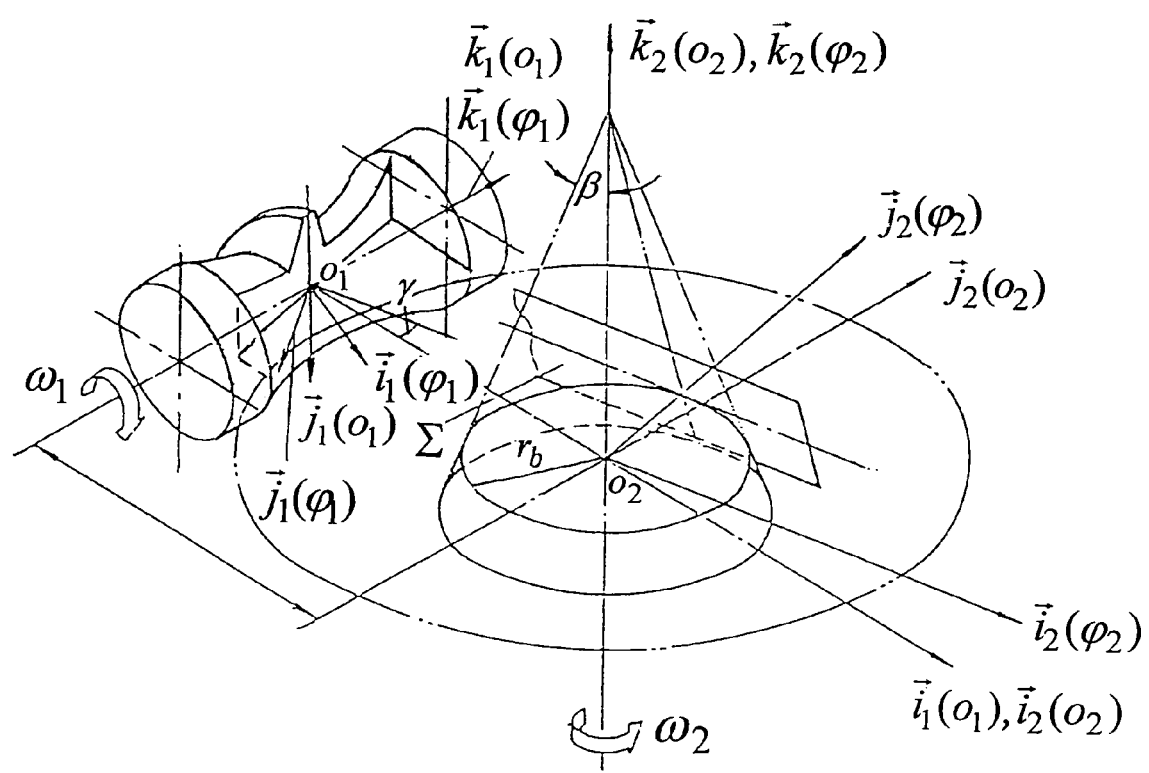
FIG. 7 is a schematic view showing forming principle for the method of forming the variable worms according to the invention.

By referring to the attached drawings and embodiments, the technical scheme of the invention is further expounded as follows:

As shown in the FIGS. 4 and 7, an imaginary cone with the radius $r_b$ of the main basic circle and the half conic angle β is correlated to the coordinate system $\{\sigma_2(\phi_2)[O_2; \vec{i}_2(\phi_2), \vec{j}_2(\phi_2), \vec{k}_2(\phi_2)]\}$, and let a generatrix plane Σ be tangential to the cone at point o, the inclination angle of the plane Σ relative to $k_2(\phi_2)$-axis be β, the parameters u and v are introduced to express the characteristics of the plane Σ. In this invention the cutting edge of the disc-shaped cutter is disposed on the generatrix plane Σ described by u and v, and is tangential to the circular cone expressed by $r_b$ and β. It is not hard to be seen what the coordinate relationship among the cone and the tangential plan Σ as well as a disc-shaped cutter is. The relationship between disc-shaped cutter and the coordinate system $\{\sigma_2(\phi_2)[O_2; \vec{i}_2(\phi_2), \vec{j}_2(\phi_2), \vec{k}_2(\phi_2)]\}$, will be further described, as jointly viewed with FIGS. 5 and 6.

Figure 5:
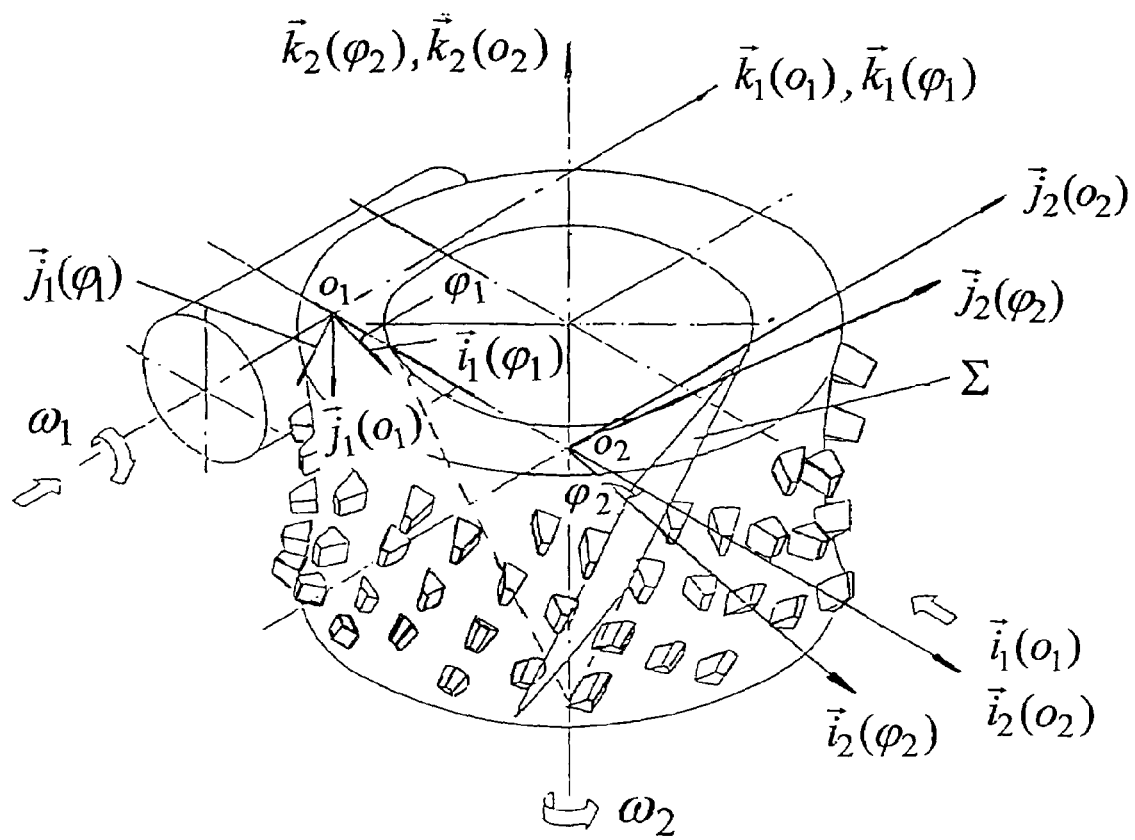
FIG. 5 is a schematic view showing the relationship between disc-shaped cutter and a coordinate system $\{o_2(\phi_2)[O_2; \vec{i}_2(\phi_2), \vec{j}_2(\phi_2), \vec{k}_2(\phi_1)]\}$ according the principle of the invention.

As shown in the FIGS. 5 and 6, while the described disc-shaped cutter rotates about its own $\vec{k}_2(\phi_2)$-axis, the generatrix plane Σ shall take the cutting edge thereon to rotate about $\vec{k}_2(\phi_2)$-axis and keeps the tangential state with the cone from beginning to end. The cutting edge of the disc-shaped cutter described in this invention is disposed on the generatrix plane Σ as shown in the FIG. 6. When the generatrix plane Σ tangential to the cone rotates about $\vec{k}_2(\phi_2)$-axis up to a position I, a row of the cutting edges are distributed on the generatrix plane Σ with the inclination angle β, while the generatrix plane Σ tangential to the cone rotates about $\vec{k}_2(\phi_2)$-axis up to another position II, another row of the cutting edges are also on the generatrix plane Σ, the inclination angle of the generatrix plane Σ is still β. The milling-cutter rotates around $\vec{k}_2(\phi_2)$-axis at angular speed $|\vec{\omega}_2|$, $|\vec{\omega}_1|/|\vec{\omega}_2|=i_{12}$ and $i_{12}$ is a constant; the feed motion of the milling cutter comprises the radial shift along $\vec{k}_2(\phi_2)$-axis and the peripheral shift around $\vec{k}_2(\phi_2)$-axis. The coordinate values of any point on the cutting edge are all calculated according to the equations disclosed as follows:

$$x = u$$

$$y_2 = r_b - v \sin \beta$$

$$z_2 = v \cos \beta$$

Where, u, v are the parameters of the generatrix plane of variable tooth worm; β is the inclination angle of the generatrix plane; $r_b$ is the radius of the main basic circle of the cutter body; $x_2$, $y_2$, $z_2$ are the coordinate values of the cutting edge on the generatrix plane.

The method of this invention is illustrated in FIG. 7, showing the relative coordinate relationship between the worm-blank and the milling cutter in the coordinate systems according to the invention. Another moving coordinate system $\{\sigma_1(\phi_1)[O_1; \vec{i}_1(\phi_1), \vec{j}_1(\phi_1), \vec{k}_1(\phi_1)]\}$ is correlated to the worm blank of the VTW worms, wherein the worm blank of the VTW worms rotates around $\vec{k}_1(\phi_1)$-axis at angular speed $|\vec{\omega}_1|$, therefore shifting of cutting edge of the cutter on the cutter head according to the method of the invention on the inclined generatrix plane in spatial locations is to envelop out and form the tooth flank of variable worms in the worm blank.

The detailed explanations of the method of this invention are given by following preferred embodiments.

Embodiment 1:

On a five-simultaneously-working-axis CNC machine-tool, given that a VTW worm to be machined has β=18° the inclination angle of the generatrix plane, $d_1$=50.2 mm the reference diameter, and the center distance between the worm blank and the milling-cutter a=101.6 mm, the milling-cutter performs a cutting movement relatively to the worm blank with the transmission ratio between the worm blank and the milling cutter i=41/4; the worm blank rotates around $\vec{k}_1(\phi_1)$-axis at angular speed $\vec{\omega}_1$, while the milling cutter rotates about $\vec{k}_2(\phi_2)$-axis at angular speed $\vec{\omega}_2$ and simultaneously makes a radial feed along $\vec{i}_2(o_2)$-axis and a peripheral feed around $\vec{k}_2(\phi_2)$-axis. The radius of the main basic circle of the milling cutter $r_b$=33 mm and the coordinate values of the cutting edge of the milling cutter are described according to the following equations $$x_2 = u,$$

$$y_2 = r_b - v \sin \beta,$$

$$z_2 = v \cos \beta.$$

Where,
u=64~74
v=−24~24
when u=70, v=−12, then
$x_2$=70 mm,
$y_2$=33−(−12×sin 18°)=36.708 mm,
$z_2$=−12×cos 18°=−11.413 mm.

All blades are fully mounted in three dimensions on the milling cutter body and the cutting edges are all located at a spatial generatrix family.

Embodiment 2:

On a five-simultaneously-working-axis CNC machine-tool, given that a VTW worm to be machined has β=18° the inclination angle of the generatrix plane, $d_1$=50.2 mm the reference diameter, and the center distance between the worm blank and the milling-cutter a=101.6 mm, the milling-cutter performs a cutting movement relatively to the worm blank with the transmission ratio between the worm blank and the milling cutter i=41/4.

Besides rotating around $\vec{k}_1(\phi_1)$-axis at angular speed $\vec{\omega}_1$, the worm blank also makes a slight axial displacement along $\vec{k}_1(\phi_1)$-axis with the value $\Delta k_1$=1.05 mm in order to make the reference toroid of VTW worm become an elliptic or parabolic one.

While the milling cutter rotates about $\vec{k}_2(\phi_2)$-axis at angular speed $\vec{\omega}_2$ and simultaneously makes a radial feed along $\vec{i}_2(o_2)$-axis and a peripheral feed around $\vec{k}_2(\phi_2)$-axis.

The radius of the main basic circle of the milling cutter $r_b=33$ mm and the coordinate values of the cutting edge of the milling cutter are described according to the following equations $x_2=u$, $y_2=r_b-v \sin \beta$ $z_2=v \cos \beta$.

Where,
 u=64~74
 v=−24~24
 when u=70, v=−12, then
 $x_2=70$ mm,
 $y_2=33-(-12\times\sin 18°)=36.708$ mm,
 $z_2=-12\times\cos 18°=-11.413$ mm.

All blades are fully mounted in three dimensions on the milling cutter body and the cutting edges are all located at a spatial generatrix family.

Embodiment 3:

On a five-simultaneously-working-axis CNC machine-tool, given that a VTW worm to be machined has β=15.9° the inclination angle of the generatrix plane, $d_1=50$ mm the reference diameter, and the center distance between the worm blank and the milling-cutter a=125 mm, the milling-cutter performs a cutting movement relatively to the worm blank with the transmission ratio between the worm blank and the milling cutter i=42/3.

Besides rotating around $\vec{k}_1(\phi_1)$-axis at angular speed $\vec{\omega}_1$, the worm blank also makes a slight axial displacement along $\vec{k}_1(\phi_1)$-axis with the value $\Delta k_1=1.1$ mm in order to make the reference toroid of VTW worm become an elliptic or parabolic one.

While the milling cutter makes a slight axial displacement with the value $\Delta k_2=1.3$ mm along $\vec{k}_2(\phi_2)$-axis and a differential motion along the tangential direction around $\vec{k}_2(\phi_2)$-axis besides rotating about $\vec{k}_2(\phi_2)$-axis at angular speed $\vec{\omega}_2$ and simultaneously making a radial feed along $\vec{i}_2(o_2)$-axis and a peripheral feed around $\vec{k}_2(\phi_2)$-axis. Alternatively, the feed motion of the milling cutter is combined by three componential motions: the shift of the milling cutter along $\vec{i}_2(o_2)$-axis, the shift thereof along $\vec{k}_2(\phi_2)$-axis and the tangential shift thereof while rotating around $\vec{k}_2(\phi_2)$-axis. In this case the milling cutter will completely envelop the thread of the VTW worms.

The radius of the main basic circle of the milling cutter $r_b=38$ mm and the coordinate values of the cutting edge of the milling cutter are described according to the following equations:

$x_2=u$, $y_2=r_b-v \sin \beta$ $z_2=v \cos \beta$.

Where,
 u=80~93
 v=−30~30
 when u=90, v=15, then
 $x_2=90$ mm,
 $y_2=38-15\times\sin 15.9°=33.891$ mm,
 $z_2=15\times\cos 15.9°=14.426$ mm.

All blades are fully mounted in three dimensions on the milling cutter body and the cutting edges are all located at a spatial generatrix family.

Other preferred embodiments can be given on the basis of following parameters: assuming that the range of the center distance a of such worm transmissions is from 80 mm to 500 mm, the values of u, v and $r_b$ can be recommended as listed in the following table.

TABLE 1

| Center distance α (Unit: mm) | 80 | 100 | 125 | 160 | 200 | 250 | 315 | 400 | 500 |
|---|---|---|---|---|---|---|---|---|---|
| μ | 51~68 | 64~74 | 80~93 | 102~119 | 128~149 | 163~189 | 205~238 | 261~303 | 326~378 |
| v | ±19.4 | ±24.3 | ±30.4 | ±38.9 | ±48.6 | ±60.7 | ±76.5 | ±97.2 | ±122 |
| $r_b$ (Unit: mm) | 19~28 | 24~35 | 30~43 | 39~56 | 48~69 | 61~67 | 76~109 | 97~138 | 122~173 |
| Remark: 0° ≦ β ≦ 30° | | | | | | | | | |

Although preferred embodiments of the invention have been described above, this invention is not limited to the particular structures and features described in detail herein. It will be apparent to those skilled in the art that numerous modifications form part of the invention insofar as they do not depart from the scope of the appended claims.

What is claimed is:

1. A forming method for milling teeth of variable tooth worms, comprising the following steps:

on a multi-axis simultaneously-working CNC machine-tool, a first moving coordinate system $\{\sigma_1(\phi_1)[O_1; i_1(\phi_1); j_1(\phi_1), k_1(\phi_1)]\}$ is correlated to the worm blank of the VTW worms, wherein the worm blank of the VTW worms rotates around $k_1(\phi_1)$-axis at angular speed $|\omega_1|$; a second moving coordinate system $\{\sigma_2(\phi_2)[O_2; i_2(\phi_2); j_2(\phi_2), k_2(\phi_2)]\}$ is correlated to the milling cutter, wherein the milling-cutter rotates around $k_2(\phi_2)$-axis at angular speed $|\omega_2|$, $|\omega_1|/|\omega_2|=i_{12}$ and $i_{12}$ is a constant; the feed motion of the milling cutter comprises the radial shift along the $i_2(O_2)$-axis and the peripheral shift around the $k_2(\phi_2)$-axis; the equations of each cutting edge of the milling cutter are given as follows:

$x_2=u$ $y_2=r_b-v \sin \beta$ $z_2=v \cos \beta$ where, u, v are the parameters of a generatrix plane Σ of the variable tooth worms tangent to an imaginary cone; β is the inclination angle of the generatrix plane Σ relative to the axis of the imaginary cone; $r_b$ is the radius of the main basic circle of the cutter body; $x_2$, $y_2$, $z_2$ are the coordinate values of the cutting edge on the generatrix plane, in which when the center distance between the worm blank and the milling-cutter is from 80 mm to 500 mm, the value of u is from 51 to 378, the value of v is from ±19.4 to ±122, and the value of $r_b$ is from 19 mm to 173 mm; and β is greater than 0° and less than or equal to 30°;

and shifting of a cutting edge of the cutter on the inclined generatrix plane in spatial locations about the milling cutter forms a cutter that will form the tooth flank of the variable tooth worms in the worm blank.

2. The method as described in the claim 1, wherein the worm blank makes a slight axial displacement along $\vec{k}_1(\phi_1)$-axis.

3. The method as described in the claim 1 or claim 2, wherein the milling cutter makes both a slight displacement along axis $\vec{k}_2(\phi_2)$-axis and a differential feeding motion along the tangential direction around $\vec{k}_2(\phi_2)$-axis.

4. The method as described in the claim 1, wherein when center distance between the worm blank and the milling cutter is 80 mm, the value of u is from 51 to 68, the value of v is ±19.4, and the value of $r_b$ is from 19 mm to 28 mm.

5. The method as described in the claim 1, wherein when center distance between the worm blank and the milling-cutter is 100 mm, the value of u is from 64 to 74, the value of v is ±24.3, and the value of $r_b$ is from 24 mm to 35 mm.

6. The method as described in the claim 1, wherein when center distance between the worm blank and the milling-cutter is 125 mm, the value of u is from 80 to 93, the value of v is ±30.4, and the value of $r_b$ is from 30 mm to 43 mm.

7. The method as described in the claim 1, wherein when center distance between the worm blank and the milling-cutter is 160 mm, the value of u is from 102 to 118, the value of v is ±38.9, and the value of $r_b$ is from 39 mm to 56 mm.

8. The method as described in the claim 1, wherein when center distance between the worm blank and the milling-cutter is 200 mm, the value of u is from 128 to 149, the value of v is ±48.6, and the value of $r_b$ is from 48 mm to 69 mm.

9. The method as described in the claim 1, wherein when center distance between the worm blank and the milling-cutter is 250 mm, the value of u is from 163 to 189, the value of v is ±60.7, and the value of $r_b$ is from 61 mm to 87 mm.

10. The method as described in the claim 1, wherein when center distance between the worm blank and the milling-cutter is 315 mm, the value of u is from 205 to 238, the value of v is ±76.5, and the value of $r_b$ is from 76 mm to 109 mm.

11. The method as described in the claim 1, wherein when center distance between the worm blank and the milling-cutter is 400 mm, the value of u is from 261 to 303, the value of v is ±97.2, and the value of $r_b$ is from 97 mm to 138 mm.

12. The method as described in the claim 1, wherein when center distance between the worm blank and the milling-cutter is 500 mm, the value of u is from 326 to 378, the value of v is ±122, and the value of $r_b$ is from 122 mm to 173 mm.

* * * * *